(12) United States Patent
Andrew et al.

(10) Patent No.: US 11,025,587 B2
(45) Date of Patent: Jun. 1, 2021

(54) DISTRIBUTED NETWORK INTERNET PROTOCOL (IP) ADDRESS MANAGEMENT IN A COORDINATED SYSTEM

(71) Applicant: EMC IP Holding Company LLC, Hopkinton, MA (US)

(72) Inventors: Patrick Andrew, Olympia, WA (US); Alexander Bahm, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 16/177,304

(22) Filed: Oct. 31, 2018

(65) Prior Publication Data
US 2020/0137023 A1    Apr. 30, 2020

(51) Int. Cl.
*G06F 15/16* (2006.01)
*H04L 29/12* (2006.01)
*H04L 12/26* (2006.01)

(52) U.S. Cl.
CPC ...... *H04L 61/2015* (2013.01); *H04L 43/0817* (2013.01); *H04L 61/2046* (2013.01); *H04L 61/2061* (2013.01)

(58) Field of Classification Search
CPC ............ H04L 61/2015; H04L 43/0817; H04L 61/2061; H04L 61/2046
See application file for complete search history.

(56) References Cited

U.S. PATENT DOCUMENTS

| | | | |
|---|---|---|---|
| 6,957,276 B1* | 10/2005 | Bahl | H04L 61/2015 709/226 |
| 7,764,773 B2 | 7/2010 | Haumont | |
| 2010/0131973 A1 | 5/2010 | Dillon et al. | |
| 2013/0326066 A1 | 12/2013 | Shalberg et al. | |
| 2013/0346618 A1* | 12/2013 | Holkkola | H04L 61/2007 709/226 |
| 2014/0233587 A1 | 8/2014 | Liu et al. | |

(Continued)

OTHER PUBLICATIONS

Notice of Allowance received for U.S. Appl. No. 16/179,329 dated Jan. 30, 2020, 46 pages.

(Continued)

*Primary Examiner* — Padma Mundur
(74) *Attorney, Agent, or Firm* — Amin, Turocy & Watson, LLP

(57) ABSTRACT

A dynamic ownership model is utilized for Internet protocol (IP) address allocation and management. Dynamic ownership is determined on a first-come, first-serve basis. According to an embodiment, IP address ownership can be coordinated through a lock coordinator on a per-node basis via a communication channel that is independent of the IP network being assigned. A per-node IP manager can request for a lock for a specific IP address, and if granted, the per-node IP manager can create an IP resource object, apply the IP resource object data to an interface on the node, set up the interface to receive traffic, and continuously issue checks to ensure that the node is allowed to own this IP resource object. Since each node participates in IP address ownership based on its own network status, overheads associated with synchronizing node state to a central IP address coordinator can be significantly reduced.

20 Claims, 10 Drawing Sheets

(56) References Cited

U.S. PATENT DOCUMENTS

| | | | |
|---|---|---|---|
| 2016/0127509 A1* | 5/2016 | Uriel | H04L 61/2015 |
| | | | 709/203 |
| 2016/0255514 A1 | 9/2016 | Kim et al. | |
| 2017/0093790 A1* | 3/2017 | Banerjee | H04L 67/1023 |
| 2019/0021117 A1 | 1/2019 | Zhou et al. | |
| 2019/0104398 A1 | 4/2019 | Owen et al. | |

OTHER PUBLICATIONS

Notice of Allowance received for U.S. Appl. No. 16/861,695 dated Sep. 22, 2020, 46 pages.

\* cited by examiner

DISTRIBUTED NETWORK INTERNET PROTOCOL (IP) ADDRESS MANAGEMENT IN A COORDINATED SYSTEM

TECHNICAL FIELD

The subject disclosure relates generally to a system and method that facilitates distributed network Internet protocol (IP) address management in a coordinated system.

BACKGROUND

The large increase in amount of data generated by digital systems yearns for more sophisticated approaches to data storing, processing, and analyzing. In this context, scale-out network-attached storage (NAS) systems have proved popular as a technology for managing this "Big Data." Some scale-out NAS systems utilize a virtual Internet protocol (IP) failover scheme based on dynamic IP address allocation that distributes IP addresses to nodes participating in the IP address pool assigned to the NAS cluster. When allocating dynamic IP addresses within a clustered system, coordination of IP address ownership is critical to cluster operations. Moreover, the coordination is exclusive, i.e., only one network interface attached to a host (e.g., node of the NAS cluster) can own a network visible IP address at a time. A host can advertise ownership of an IP address by sending an Address Resolution Protocol (ARP) packet to a switch. Two or more network hosts attempting to claim the same IP address via ARP can lead to packet routing problems, known as an ARP conflict, on the network, resulting in the hosts becoming unreachable.

To avoid such ARP conflicts, IP management can be implemented, wherein an IP manager can assign and revoke IP addresses exclusively to the hosts that are being managed. When a single and/or central coordinator in the system assigns IP addresses to each host, the ARP conflicts can be significantly reduced and prevented. For example, when a host receives its IP address assignment from the coordinator, it can transmit a gratuitous ARP to the switch. Any ARP conflict will settle almost immediately as the routing table will accurately reflect the Host:IP assignment designated by the coordinator. However, IP management via the single/central coordinator can have several drawbacks. For example, the coordinator is a single point of failure. In addition, the coordinator should be aware of each individual host's local state. As the size of the system grows, the amount of local state being replicated becomes untenable, and the likelihood of failure can significantly increase. These issues can cause problems in large distributed systems.

The above-described background relating to file systems is merely intended to provide a contextual overview of some current issues and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to a distributed IP address coordination in a clustered system. In one example embodiment, a system is disclosed that comprises a processor and a memory that stores executable instructions that, when executed by the processor, facilitate performance of operations. Moreover, the operations comprise: requesting, from a distributed resource coordinator component of the clustered system, exclusive access to a distributed resource representational of an Internet Protocol (IP) address, wherein the requesting comprises sending request data via a primary communication channel that is independent of an IP network that is being assigned. Further, the operations comprise in response to receiving a notification from the distributed resource coordinator component that indicates that the exclusive access has been granted, initiating an IP resource object associated with the IP address, wherein data from the IP resource object, is applied to an interface associated with the IP network to facilitate communication via the IP network.

Another example embodiment of the specification relates to a method that comprises directing, by a node device of a clustered system that comprises a processor, request data to a distributed resource coordinator component of the clustered system via a primary communication network, wherein the request data is indicative of a request for exclusive access to an Internet Protocol (IP) address associated with a secondary IP network; and in response to receiving a notification from the distributed resource coordinator component that indicates that the exclusive access has been granted, initiating, by the node device, an IP resource object associated with the IP address, wherein the IP resource object is applied to a local interface associated with the secondary IP network to facilitate communication via the secondary IP network.

Another example embodiment of the specification relates to a computer-readable storage medium comprising instructions that, in response to execution, cause a computing node device comprising a processor to perform operations, comprising directing, to a distributed resource coordinator component of the clustered system via a primary communication network, request data indicative of a request for exclusive access to a resource representational of an Internet Protocol (IP) address associated with a secondary communication network. The operations further comprise: in response to determining that the exclusive access has been granted, providing data necessary to instantiate the IP resource object associated with the IP address, wherein the IP resource object data is then applied to an interface associated with a secondary communication network to facilitate communication via a secondary IP network.

The following description and the drawings set forth certain illustrative aspects of the specification. These aspects are indicative, of but a few of the various ways in which the principles of the specification may be employed. Other advantages and novel features of the specification will become apparent from the detailed description of the specification when considered in conjunction with the drawings.

DETAILED DESCRIPTION

Figure 1:
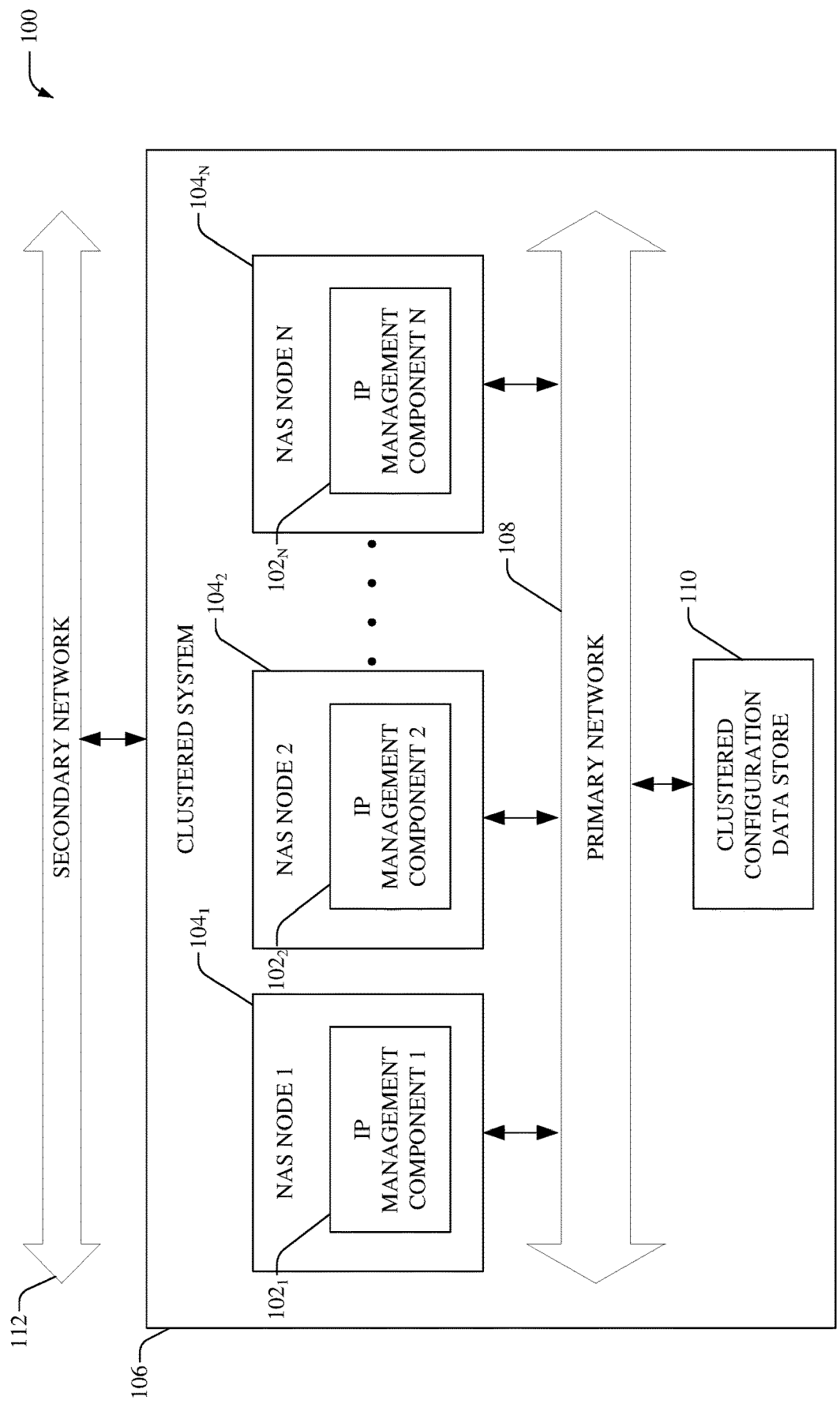
FIG. 1 illustrates an example system that facilitates distributed internet protocol (IP) address management in a storage cluster.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example systems and methods disclosed herein, in one or more embodiments, relate to a scale-out network attached storage (NAS) platform that combines modular hardware with unified software to harness unstructured data. In one aspect, the NAS platform can comprise a cluster of nodes that delivers a scalable pool of storage with a global namespace. The NAS platform's unified software provides centralized web-based and command-line administration to manage at least the following features: (i) a cluster that runs a distributed file system; (ii) scale-out nodes that add capacity and performance; (iii) storage options that manage files and tiering; (iv) flexible data protection and high availability; and/or (v) software modules that control costs and optimize resources.

Hosts (e.g., nodes) within the NAS platform can advertise ownership of an internet protocol (IP) address by sending an Address Resolution Protocol (ARP) packet to a network switch. When two (or more) network hosts attempt to claim the same IP address via ARP, a routing problem, for example, an ARP conflict, is created on the network, resulting in either host to be unreachable. IP address management can be used to prevent ARP conflicts, wherein a manager must assign, and revoke IP addresses exclusively to the hosts that are being managed. Conventionally, IP address assignment is performed through a central coordinator host that allocates each Host:IP address assignment (e.g., similar to Dynamic Host Configuration Protocol (DHCP)). However, these conventional systems (e.g., utilizing a central/single coordinator for IP address assignments) have several drawbacks, for example, the central/single coordinator is a single point of failure, and the central/single coordinator has to determine each individual host's local state in order to make IP addressing assignments. As the size of a system with a central coordinator grows, the amount of local state being replicated becomes untenable, and the likelihood of failure increases.

Systems and methods disclosed herein overcome the above noted challenges by implementing a different model for IP address ownership, herein referred to as "Dynamic Ownership," wherein IP address management is distributed across the hosts of the clustered system. Dynamic ownership is determined on a first-come, first-serve basis (e.g., a host that claims an IP address first gets to use it first). Moreover, each host can choose to participate in IP address ownership based on its own network status and thus, eliminate the single/central IP address coordinator and the state synchronizes to that central coordinator.

Referring initially to FIG. 1, there illustrated is an example system 100 that facilitates distributed IP address management in a storage cluster, according to one or more aspects of the disclosed subject matter. In one aspect, IP management components 1-N ($102_1$-$102_N$; wherein N is most any integer) of NAS nodes 1-N ($104_1$-$104_N$) within a clustered system 106 can facilitate distributed IP address management.

As an example, the NAS nodes 1-N ($104_1$-$104_N$) can store large volumes of data, such as Big Data, which is typically mined for information and/or patterns. Big Data is characterized by the large amount of data, the different types of data, and/or the rate at which the data must be processed. For example, Big Data can refer to, but is not limited to, petabytes and/or exabytes of data, that need specialized approaches to storage and/or analysis. According to an aspect, the Big Data stored within NAS nodes 1-N ($104_1$-$104_N$) can comprise raw data and metadata associated with the raw data. A set of clients, for example, Network File System (NFS) clients (not shown), can connect (e.g., simultaneously and/or substantially simultaneously) to the NAS nodes 1-N ($104_1$-$104_N$) via a network interface of a secondary network 112 (e.g., an IP network) to access the stored data. As an example, the clients can read, write, add, and/or delete data based on access privileges assigned to the clients. In one embodiment, the system 106 intelligently manages client connections such that client connections are transparent and appear as a single network element to the client device; client connections are balanced evenly across all the nodes 1-N ($104_1$-$104_N$), varying levels of services can be provided to the clients based on defined parameters; resilient and/or reliable connections can be provided; etc. Moreover, the system 106 can provide always-on access to the client devices.

In an aspect, system 106 can utilize a virtual IP failover scheme for scale-out NAS that does not require any client-side drivers. As an example, system 106 utilizes dynamic IP, wherein IP addresses are distributed to nodes (e.g., nodes 1-N ($104_1$-$104_N$)) that are participating in an IP address pool (e.g., assigned to the system 106). If a node becomes unavailable (e.g., due to a failure, reboot, etc.), its IP address(es) is(are) automatically moved to another available node to preserve NFS connections to client devices.

Coordination of IP addresses (e.g., IPv4 and/or IPv6) is traditionally managed using a Dynamic Host Control Protocol (DHCP). DHCP is a single point of configuration for IP address management, wherein hosts on the network ask a DHCP server for an IP address (e.g., referred to as IP allocation). This can create significant challenges when the network and hardware configuration is not static. For a clustered system, IP addresses are grouped, for example, within the same subnet. When adding and removing hardware to the clustered system using DHCP, there is an additional administrative overhead of managing the DHCP host records for each of hardware for static IP allocation. In this scenario, there is a 1:1 relationship between MAC hardware address and IP address defined in DHCP, lending to maintenance overheads as the number of hosts increases. To solve this issue, the DHCP can be configured to dynamically assign unallocated IP addresses to new hosts on the network for a lease period. This works as hosts are added and deleted, but for a clustered system, having IP addresses that become unresolvable creates data availability problems. DHCP-assigned IP addresses are not re-distributed during a fault event (since the DHCP does not have information regarding the cluster status).

Removing the 1:1 association of IP addresses to hosts and allowing the IP addresses to be dynamically reassigned allows the IP address to be Highly Available (HA). This is referred to as a Dynamic IP address. A dynamic IP address allows the network to be oblivious to faults as the IP address moves between hosts in such scenarios. Accordingly, to provide dynamic IP addresses, IP address management can be delegated to the clustered system (e.g., system 106), that is aware of its own state and/or configuration. To accomplish this, the cluster is assigned a block of IP addresses or an IP address pool via the system administrator. Allocation rules such as static and/or dynamic are determined by the clusters network configuration. Static IP addresses are guaranteed to always be assigned to a single cluster host, while dynamic IP addresses can float between hosts depending on the allocation policy and/or cluster state.

In one aspect, clustered systems can self-manage IP addresses by sending ARP probes to verify if anyone is using a specific IP address. This approach has a network penalty of adding delay time to allow conflicting network hosts sufficient time to respond to probe requests. In another aspect, the cluster can centrally manage IP assignment. Since it is fully aware of its own state, it can reliably assign and revoke IP addresses to its members. In this scenario, IP address coordination is performed by utilizing a single coordinator, with a deterministic host running the coordinator. However, a single and/or central coordinator is a single point of failure. Further, rigid policies for determining which host runs the IP address coordinator can result in unnecessary movement of service IP addresses. This policy has no central coordinator, and sometimes multiple hosts have determined that they should be the IP address coordinator, incorrectly claiming the service IP address and creating ARP conflicts. In addition, the lack of serviceability checks combined with the rigid policies can cause IP addresses to be being assigned to nodes with unavailable services.

Referring back to FIG. 1, system 106 overcomes the above noted issues by utilizing a dynamic ownership model for IP address allocation and management. Dynamic ownership is determined on a first-come, first-serve basis. The host which claims an IP address first gets to use it first. According to an embodiment, the IP management components 1-N ($102_1$-$102_N$) can determine IP addres(es) that are to be claimed based on data stored within a clustered configuration data store 110 and can coordinate IP address ownership through a lock coordinator (e.g., distributed resource coordinator shown in detail with respect to FIG. 2) via a communication channel that is independent of the IP network being assigned, for example, a primary network 108 (e.g., a backend network that connects the cluster 106).

Typically, a per-host IP manager (e.g., IP management components 1-N ($102_1$-$102_N$)) of a node (e.g., nodes 1-N ($104_1$-$104_N$)) can request for a lock for a resource (e.g., file) associated with a specific IP address, and if granted, the per-host IP manager can create an IP resource object, apply the network data from the IP resource object to the interface on the node in order to set up the interface to receive traffic, and periodically issue checks to ensure that the node is allowed to own this IP resource object. Since each node participates in IP address ownership based on its own status, only the nodes eligible to participate in IP resource management will participate, significantly reducing overheads associated with synchronizing node state to a central IP address coordinator.

In one example, the NAS nodes $104_1$-$104_N$ can comprise a node and cluster storage system such as an Dell EMC® Isilon® Cluster that operates under the OneFS® operating system and utilizes SmartConnect functionality that enables intelligent client connection load balancing and failover support. However, it is noted that the embodiments disclosed herein are not limited to the Dell EMC® Isilon® Cluster and can be utilized by most any storage platform such as but not limited to, VMware clustered services. Further, it is noted that the NAS nodes $104_1$-$104_N$ can comprise volatile memory(s) or nonvolatile memory(s) or can comprise both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

Figure 2:
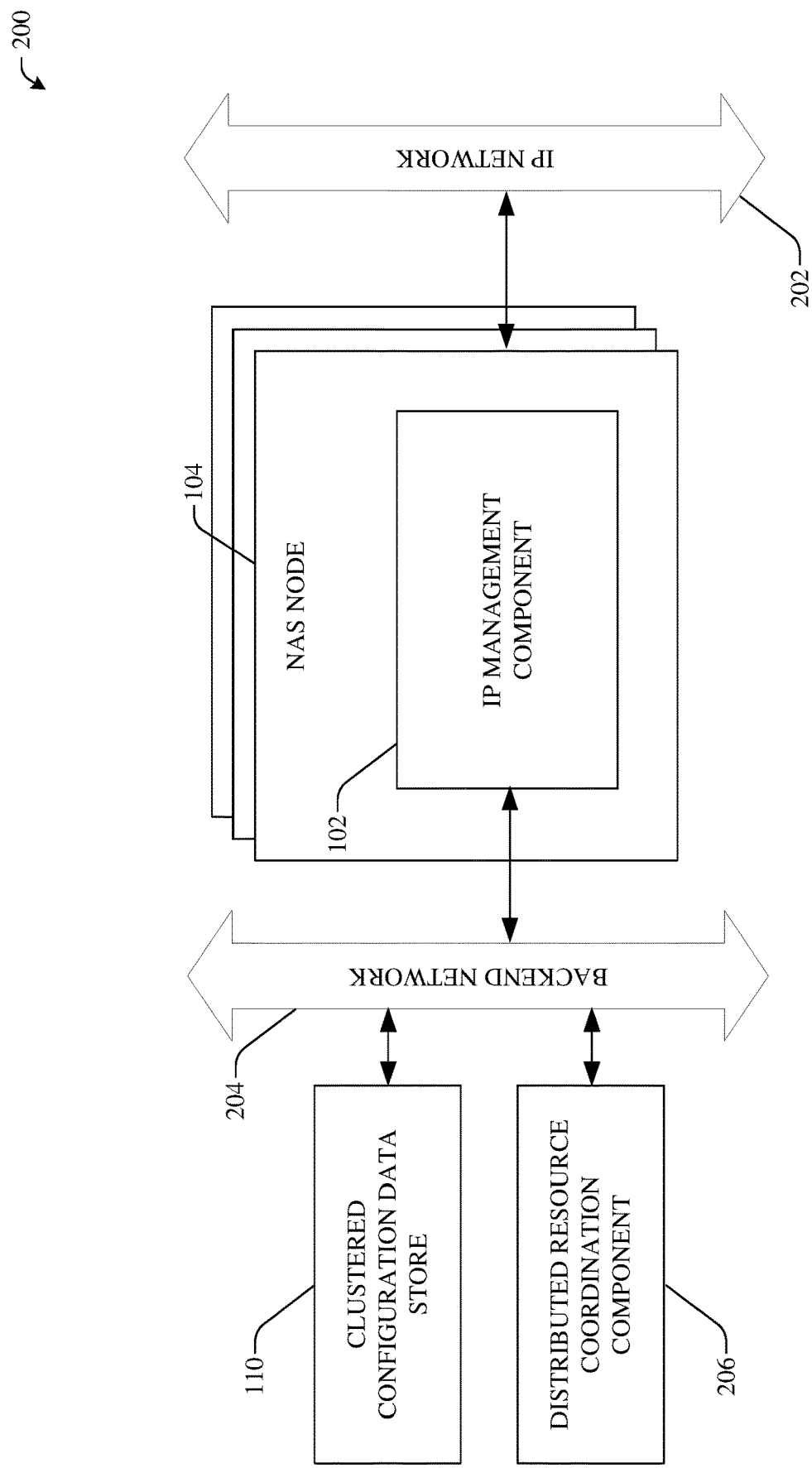
FIG. 2 illustrates an example system that facilitates IP address coordination across nodes of a coordinated distributed system.

Referring now to FIG. 2, there is illustrated an example system 200 that facilitates IP address coordination between nodes of a coordinated distributed system, according to an aspect of the specification. In one aspect, the system 200 can be utilized in highly available systems wherein delays in IP address assignments are to be avoided. It is noted that the IP management component 102 is substantially similar to the IP management components $102_1$-$102_N$ described with respect to system 100 and can include functionality as more fully described herein, for example, as described above with regard to the IP management components $102_1$-$102_N$. Further, its is noted that the NAS node 104 is substantially similar to the NAS nodes $104_1$-$104_N$ described with respect to system 100 and can comprise functionality as more fully described herein, for example, as described above with regard to the NAS nodes $104_1$-$104_N$.

System 200 provides a distributed IP address management model for efficiently coordinating IP addresses within a clustered system. In an aspect, each host (e.g., node 104) of system 200 can have access to (i) a primary communication network (e.g., backend network 204) that is independent of a secondary communication network (e.g., IP network 202) being assigned; (ii) a clustered configuration data store 110; (iii) a distributed resource coordination component 206 with exclusive locking; and (iv) a per-host IP management component 102, etc.

The IP management component 102 communicates with the clustered configuration data store 110 and the distributed resource coordination component 206 via a backend network 204 (e.g., InfiniBand network, Ethernet network, etc.) that is separated from the IP network 202 being coordinated via distributed IP address management. As an example, the clustered configuration data store 110 stores data associated with the cluster, such as, but not limited to cluster/node configuration and/or state (e.g., cluster is upgrading, scaling up or out, etc.), network configuration data (e.g., subnet, netmask, gateway, virtual local area network (VLAN) information, available interfaces, available IP addresses, etc.), IP address pool (e.g., a block of IP addresses that have been delegated to the cluster), the host membership within an IP address pool. Based on the stored data (and/or changes to the stored data), the IP management component 102 can determine one or more IP addresses for which the node 104 can claim ownership.

According to an aspect, to claim ownership of the one or more IP addresses, the IP management component 102 can request the distributed resource coordination component 206 for exclusive access to an identifier arbitrarily bound to the dynamic IP address(es). For example, the IP management component 102 can request ownership of the identifier "foo", deterministically created by the IP management component 102. Taking ownership of a resource maps to requesting for an exclusive lock on a file. The lock request can be asynchronous, allowing for easy cancellation. The distributed resource coordination component 206 can grant the request or can respond with a request pending notification (e.g., wherein the request can be granted at a later time). In one example, the distributed resource coordination component 206 can be distributed across multiple host nodes of the cluster which facilitates coordination over a backend network. Once granted, the IP management component 102 can then claim ownership of the IP address to the network with an ARP request, followed by setting up an internal ownership state.

Further, the IP management component 102 can initiate a per-node health checker that issues network health checks (e.g., periodically, at a defined time, in response to an event, on demand, etc.). If a network health check fails, the health checker can tear down network state and revoke ownership of the IP address, allowing the next requester take ownership (e.g., as determined by the distributed resource coordination component 206). Moreover, the distributed resource coordination component 206 can notify nodes that have resource requests that are in the pending state, when a resource has become available, where they can then react to resource changes faster than polling for availability.

Figure 3:
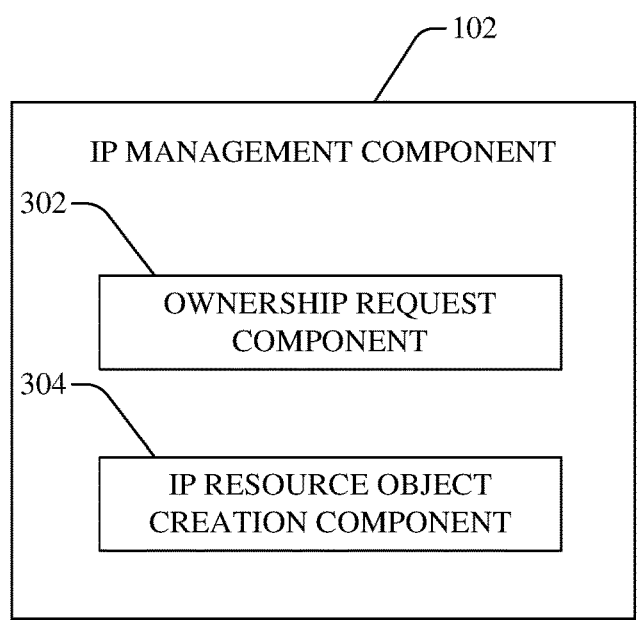
FIG. 3 illustrates an example system that facilitates per-host IP address management coordination.

FIG. 3 illustrates an example system 300 that facilitates per-host IP address management coordination, according to one or more aspects of the disclosed subject matter. In one aspect, the system 300 can be utilized in nodes of a clustered system (e.g., NAS cluster). It is noted that the IP management component 102 can comprise functionality as more fully described herein, for example, as described above with regard to system 200.

The IP management component 102 can facilitate IP address coordination through a lock coordinator (e.g., distributed resource coordination component 206) of the cluster. According to an embodiment, an ownership request component 302 can access cluster data (e.g., stored within the clustered configuration data store 110) to determine an IP address (e.g., from the IP address pool) that is to be claimed. Further, the ownership request component 302 can generate and transfer, to the distributed resource coordination component 206, a request (e.g., exclusive lock on resource) for the determined IP address resource. If the request is granted, the node 104 then has ownership of the IP address resource and the IP management component 102 can set up the IP resource object on the node 104. As an example, an IP resource object creation component 304 can instantiate the IP resource object representing the IP state (e.g., IP address, mask, etc.) and apply the state to the network interface to receive traffic via the IP network. Alternatively, if the request is not granted, but is pending, the node 104 can wait for ownership.

Figure 4:
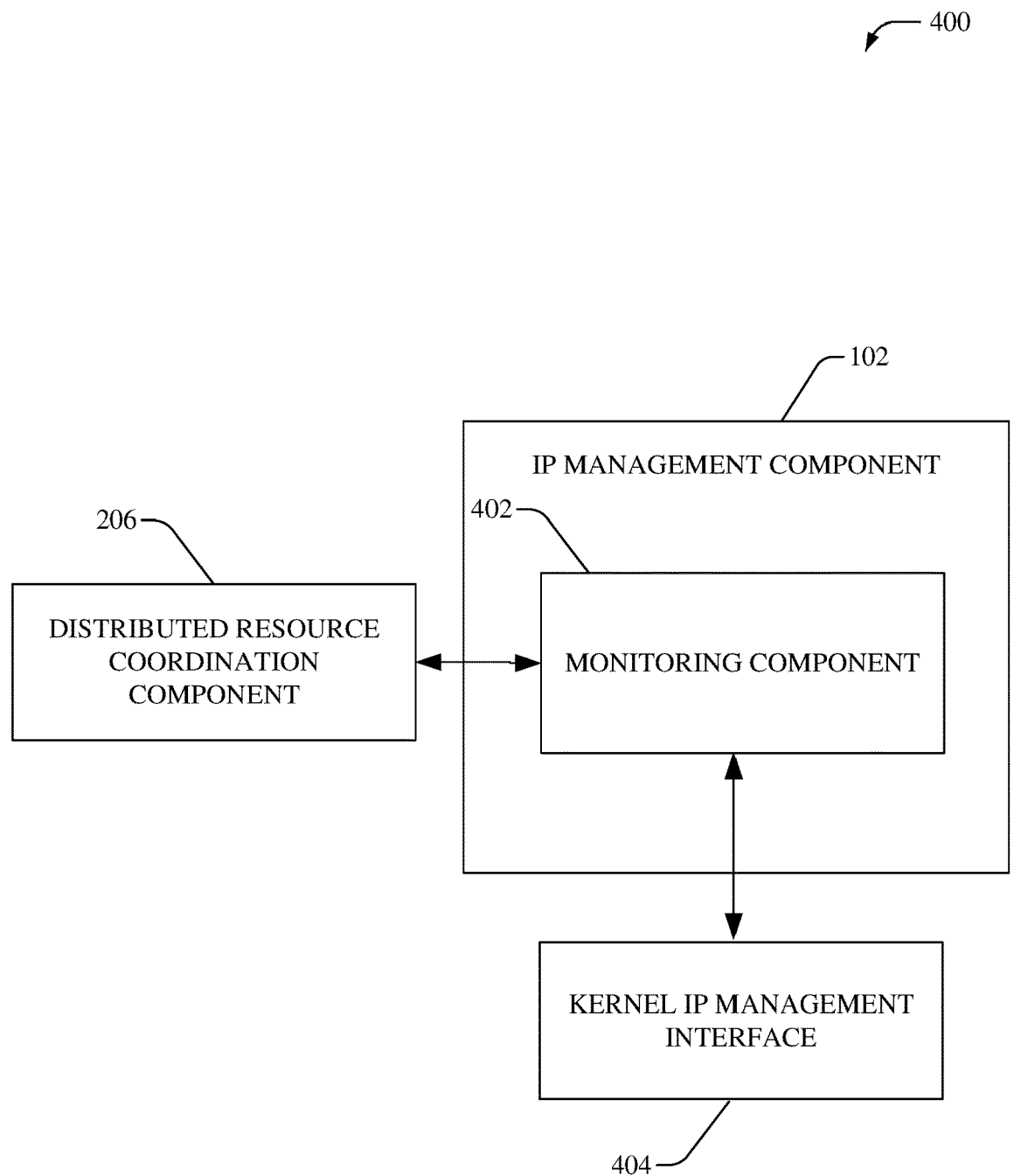
FIG. 4 illustrates an example system that facilitates a per-IP network health check to aid in resource revocation.

Referring now to FIG. 4, there illustrated is an example system 400 that facilitates a per-IP network health check to aid in resource revocation in accordance with an aspect of the specification. In one aspect, the system 400 can be utilized to efficiently coordinate allocation and/or reassignment of dynamic IP addresses in a clustered system. It is noted that the IP management component 102 and distributed resource coordination component 206 can comprise functionality as more fully described herein, for example, as described above with regard to systems 200-300.

Typically, each host (e.g., node $104_1$-$104_N$) can comprise a monitoring component 402 that can be initiated in response to creation of an IP resource object (e.g., via the IP resource object creation component 304). According to an aspect, the monitoring component 402 can track various parameters associated with the IP resource object and/or network interface to identify one or more error conditions. As an example, the monitoring component 402 can issue checks/tasks to ensure that the node is allowed to own the IP resource object. In another example, the health checks can comprise, but are not limited to, monitoring link status (e.g., verifying that link status of a link between the node and a switch of the IP network is active/operating properly), monitoring node interfaces (e.g., verifying that the interface is up and/or active), monitoring node status (e.g., verifying that the node is active/operating properly), etc. The checks can be issued at most any time, for example, periodically, on-demand, at a defined time, in response to an event, etc. In one aspect, the monitoring component 402 can verify that the tracked parameters, such as, but not limited to, interface state (e.g., associated with the kernel IP management interface 404), network state, etc. satisfy one or more defined criteria.

If determined by the monitoring component 402 that the tracked parameters do not satisfy the one or more defined criteria (e.g., a failed network health check), the monitoring component 402 can tear down the network state and revoke ownership of the IP address. Moreover, the monitoring component 402 can notify the distributed resource coordination component 206 regarding the revocation and the IP address can be released back to the IP address pool. In one example, the distributed resource coordination component 206 can then grant a pending request that has been received from another node of the cluster for exclusive access to the IP address, letting the other node take ownership.

Figure 5:
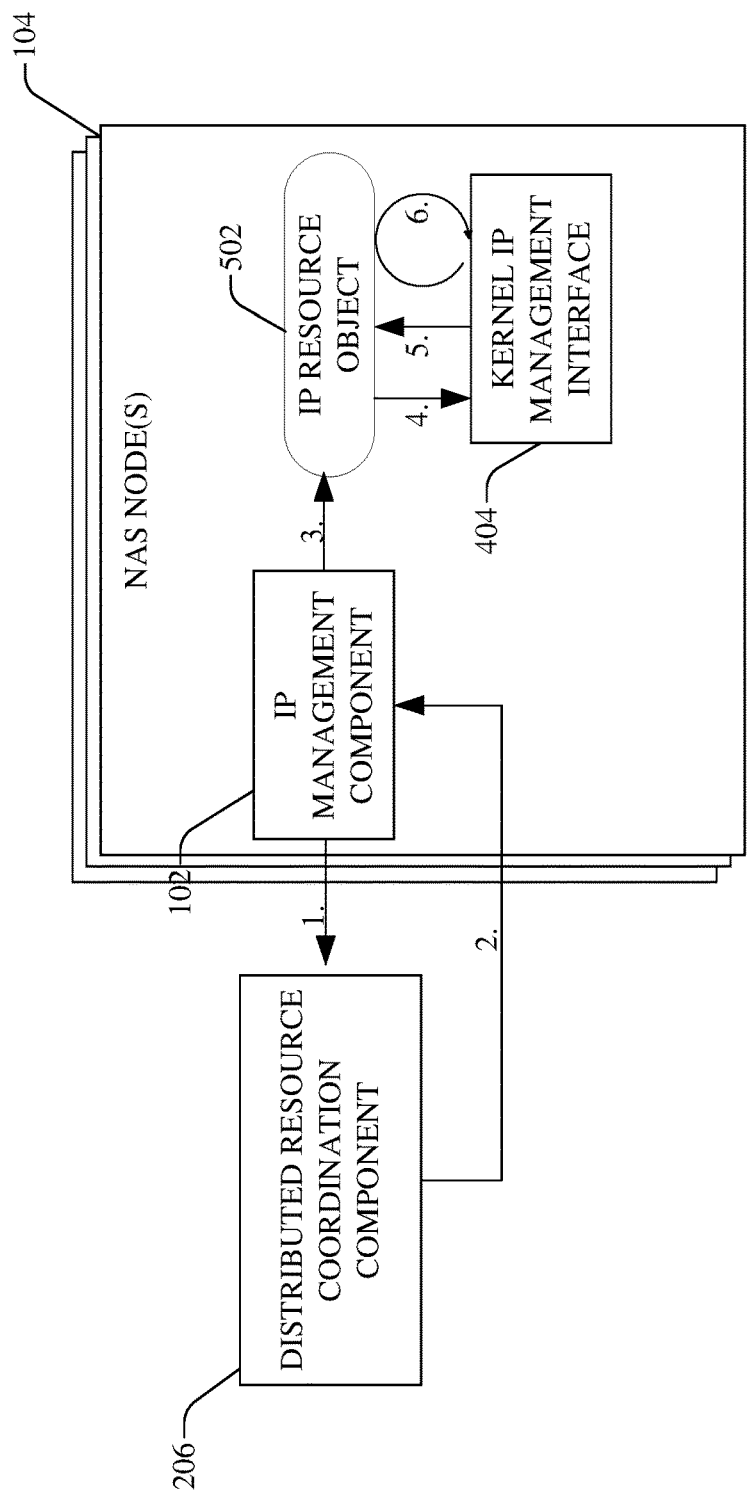
FIG. 5 illustrates an example system that coordinates ownership of dynamic IP addresses within a clustered system.

Referring now to FIG. 5, there illustrated is an example system 500 that coordinates ownership of dynamic IP addresses within a clustered system, according to an aspect of the subject disclosure. Typically, the coordination is exclusive, such that, only one host (e.g., node) can own a network visible IP address at a given time. Dynamic IP addresses are assigned based on the availability of the host (e.g., node). Availability of an individual host can be fully determined by the cluster's status and its local status. Hosts outside of the current cluster state (e.g., minority side of a group) are typically not considered for IP address assignment. It is noted that the IP management component 102, NAS node 104, and distributed resource coordination component 206 can comprise functionality as more fully described herein, for example, as described above with regard to system 200-400.

According to one aspect, as shown at 1, the IP management component can transfer (e.g., via the ownership request component 302) a request to the distributed resource coordination component 206 for exclusive ownership of an IP resource (e.g., that represents an IP address). If the request is unsuccessful (e.g., the IP resource is currently owned by another node of the cluster), the request is pending until granted (e.g., by the distributed resource coordination component 206). Alternatively, if the request is successful (e.g., the IP resource is available and not currently owned by another node of the cluster), the distributed resource coordination component 206 can respond by notifying the IP management component at 2, that the resource ownership has been granted. At 3, the IP management component can initiate an IP resource object 502 (e.g., via IP resource object creation component 304), for example, but not limited to, based on determining the resource reference and IP subnet, IP address, interface information, etc. Based on the determined information, at 4, the IP address data can be applied to the local interface 504. At 5, the resource state is reflected, and an ARP request can be transmitted on the interface to claim ownership of the IP resource.

Further, at 6, health checks are periodically issued (e.g., via the monitoring component 402). If the health checks result in a failure condition, the ownership can be revoked, and the IP address is removed. In an aspect, the IP address can be unassigned from the node device interface, the IP resource object can be destroyed, and the resource can be released to the distributed resource coordination component 206, which can then grant the resource (e.g., IP address) to another node of the cluster that has a pending request for that resource. As an example, the other node can be selected based on most any defined priority and/or policy.

Figure 6:
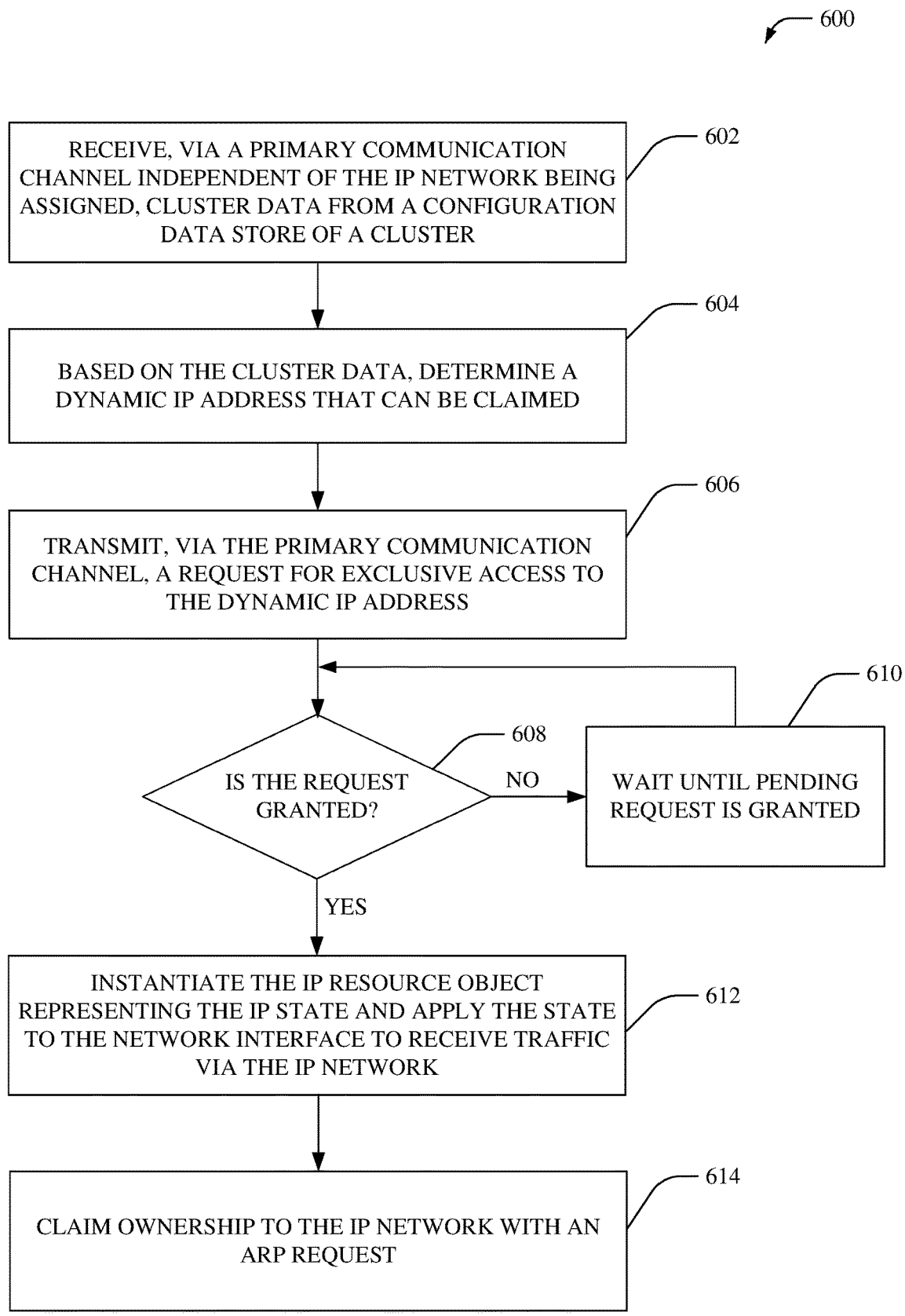
FIG. 6 illustrates an example method that facilitates per-host distributed network IP address management in a coordinated system.
Figure 7:
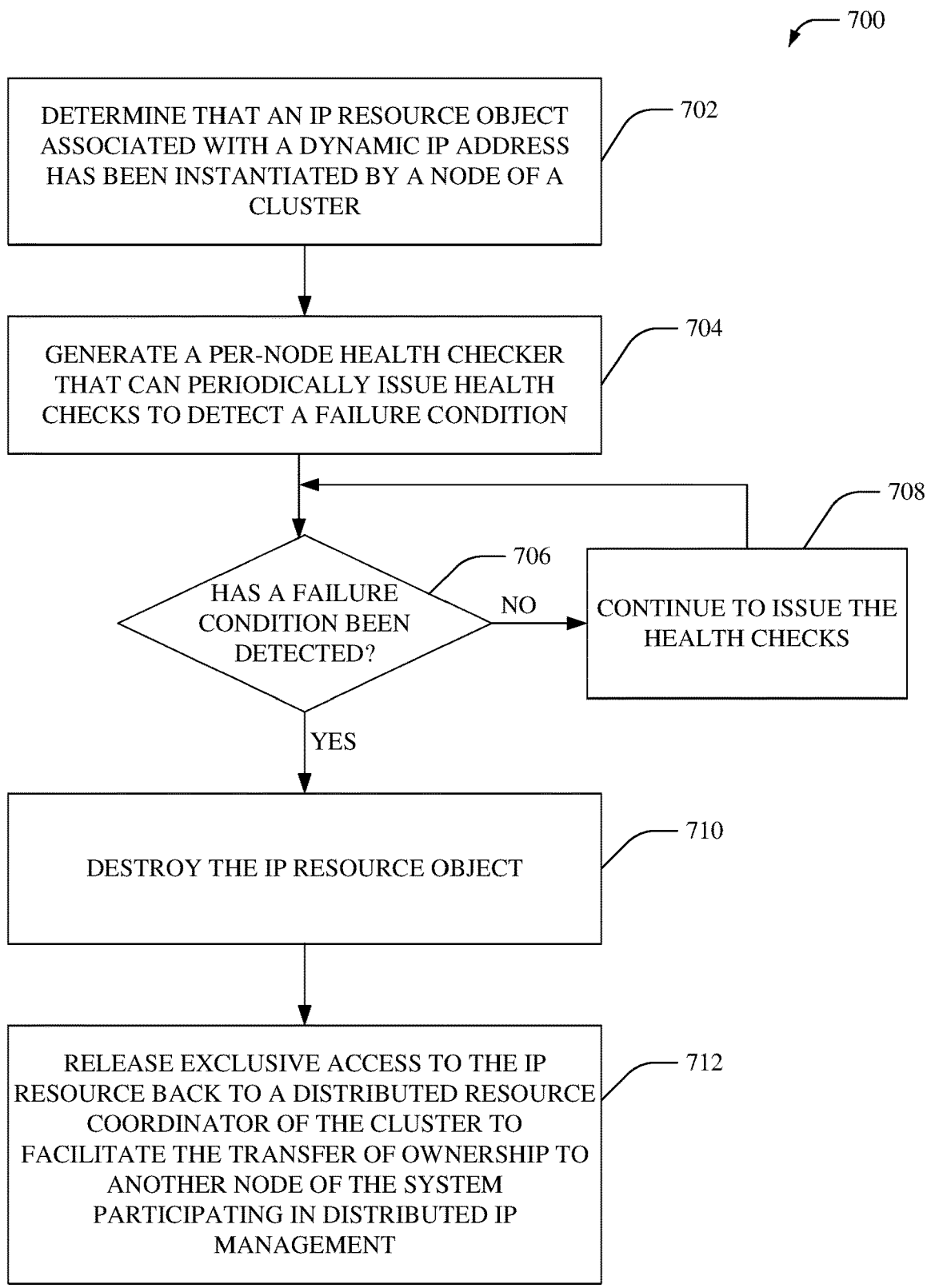
FIG. 7 illustrates an example method that facilitates per-host network monitoring to aid in resource revocation.

FIGS. 6-7 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6, there illustrated is an example method 600 that facilitates a per-host distributed network IP address management in a coordinated system, according to an aspect of the subject disclosure. In one aspect, method 600 can be implemented by one (or more) of NAS nodes of a cluster. At 602, cluster data can be received from a configuration data store of a cluster via a primary communication channel that is different from the IP network being assigned. As an example, the cluster data can comprise configuration and/or state data of the cluster. Further, the primary communication channel can comprise most any backend network (e.g., InfiniBand, Ethernet, etc.) that couples the nodes of the cluster.

At 604, a dynamic IP address that is to be claimed can be determined based on the cluster data. At 606, a request for exclusive access to the dynamic IP address can be transmitted via the communication channel, for example, to a distributed resource coordinator component that is utilized for providing exclusive locks. At 608, it can be determined if the request is granted. Moreover, if the request is pending, at 610, the method waits until the pending request is granted by the resource coordinator component, either due to the dynamic IP address resource being released by the node holding the exclusive lock, or, the coordinator component revoking the lock from the holder due to fault condition. Further, if the request is granted, at 612, an IP resource object representing an IP state can be instantiated and applied to the network interface of the IP network to receive traffic (e.g., requests from a client device) via the IP network. Additionally, if the request is granted, at 614, an ARP request can be sent over the IP network to claim ownership of the dynamic IP address.

FIG. 7 illustrates an example method 700 that facilitates per-host network monitoring to aid in resource revocation, according to an aspect of the subject disclosure. According to an aspect, method 700 can be implemented by one (or more) of NAS nodes that implement distributed IP address management. At 702, it can be determined that an IP resource object associated with a dynamic IP address has been instantiated by a node of a cluster (e.g., in response to the node claiming ownership of the dynamic IP address). At 704, a per-node health checker can be generated that can periodically (and/or at any other time) issue health checks to detect a failure condition. As an example, the per-node health checker can track one or more parameters (e.g., interface state, network state, etc.) associated with the IP resource object and/or network interface to identify one or more errors.

At 706, it can be determined whether a failure condition has been detected. If a failure condition has not been detected, at 708 the per-node health checker can continue to issue (e.g., periodically) the health checks. Alternatively, if a failure condition is detected, at 710, the IP resource object can be destroyed. Further, at 712, the exclusive access to the resource is released back to the distributed resource coordinator of the cluster, which can then facilitate the transfer of ownership to another node of the system participating in distributed IP management. As an example, the distributed resource coordinator can grant exclusive access to a node that has a pending request for access to the dynamic IP address. In an aspect, the node can be selected on a first-come, first-serve basis (e.g., node that requests for access first gets priority) or most any other operator-defined policy.

Figure 8:
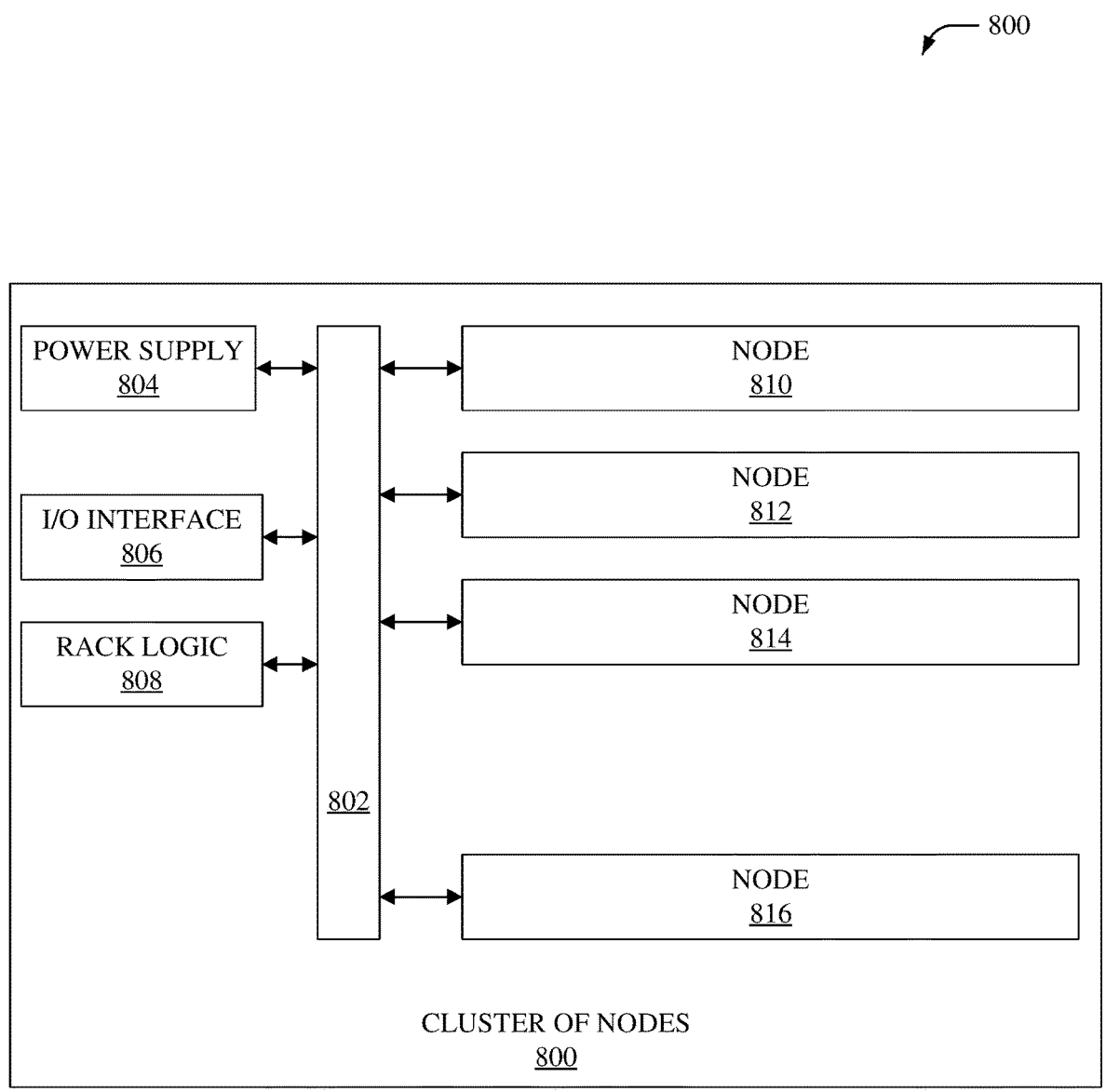
FIG. 8 illustrates an example block diagram of rack of servers in accordance with implementations of this disclosure.

FIG. 8 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can comprise processors, power blocks, cooling apparatus, network interfaces, input/output interfaces, etc. Although not shown, cluster of nodes typically comprises several computers that require a network connection and a power cord connection to operate. Each node computer often comprises redundant components for power and interfaces. The cluster of nodes 800 as depicted shows Nodes 810, 812, 814, and 816 operating in a cluster; however, it can be appreciated that more or less nodes can make up a cluster. The nodes, NAS node 104 and/or NAS nodes 104$_1$-104$_N$ described herein can be substantially similar to Nodes 810, 812, 814, and 816 and can comprise functionality as more fully described herein, for example, as described with regard to the Nodes 810, 812, 814, and 816. Nodes can refer to a physical enclosure with a varying amount of CPU cores, random access memory, flash drive storage, magnetic drive storage, etc. For example, a single node can comprise, in one example, 36 disk drive bays with attached disk storage in each bay. It can be appreciated that nodes within the cluster of nodes can have varying configurations and need not be uniform. It can be further appreciated that nodes among the cluster of nodes do not have to be in a same enclosure as shown for ease of explanation in FIG. 8 and can be geographically disparate. Backplane 802 can be any type of commercially available networking infrastructure (e.g., primary network 108, backend network 204) that allows nodes among the cluster of nodes to communicate with each other in as close to real time as the networking infrastructure allows. It can be appreciated that the backplane 802 can also have a separate power supply, logic, I/O, etc. as necessary to support communication amongst nodes of the cluster of nodes.

As shown in the figure, enclosure 800 contains at least a power supply 804, an input/output interface 806, rack logic 808, nodes 810, 812, 814, and 816, and backplane 802. Power supply 804 provides power to each component and server within the enclosure. The input/output interface 806 provides internal and external communication for components and servers within the enclosure. Backplane 802 can enable passive and active communication of power, logic, input signals, and output signals for each node.

Figure 9:
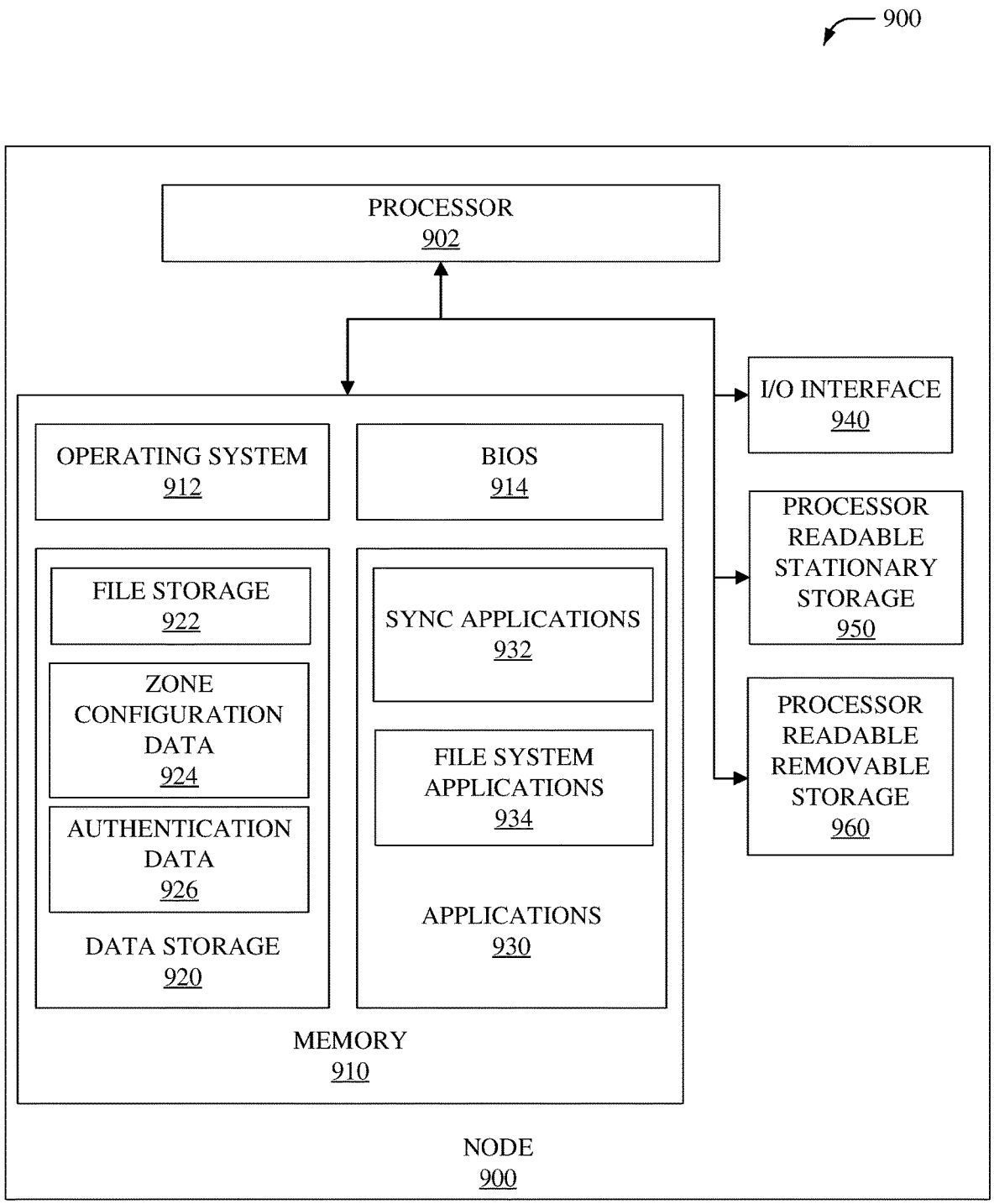
FIG. 9 illustrates an example block diagram of a server in accordance with implementations of this disclosure.

FIG. 9 illustrates an example block diagram of a node 900 in accordance with implementations of this disclosure. As shown in FIG. 8, a plurality of nodes can be included in one enclosure that shares resources provided by the enclosure to reduce size, power, and cost. NAS node 104, NAS nodes 104$_1$-104$_N$, and/or Nodes 810, 812, 814, and 816 disclosed herein can each comprise at least a portion of the node 900.

In an aspect, the node 900 comprises a processor 902 that can communicate with memory 910 via a bus. Node 900 can also comprise input/output interface 940, processor-readable stationary storage device(s) 950, and processor-readable removable storage device(s) 960. Input/output interface 940 can enable node 900 to communicate with other nodes, mobile devices, network devices, and the like. Processor-readable stationary storage device 950 can comprise one or more devices such as an electromagnetic storage device (hard disk), solid state hard disk (SSD), hybrid of both an SSD and a hard disk, and the like. In some configurations, a node can comprise many storage devices. Also, processor-readable removable storage device 960 enables processor 902 to read non-transitive storage media for storing and accessing processor-readable instructions, modules, data structures, and other forms of data. The non-transitive storage media can comprise flash drives, tape media, floppy media, disc media, and the like.

Memory 910 can comprise Random Access Memory (RAM), Read-Only Memory (ROM), hybrid of RAM and ROM, and the like. As shown, memory 910 comprises operating system 912 and basic input/output system (BIOS) 914 for enabling the operation of node 900. In various embodiments, a general-purpose operating system can be employed such as a version of UNIX, LINUX™, a specialized server operating system such as Microsoft's Windows Server™ and Apple Computer's OS X, or the like.

Applications 930 can comprise processor executable instructions which, when executed by node 900, transmit, receive, and/or otherwise process messages, audio, video, and enable communication with other networked computing devices. Examples of application programs comprise database servers, file servers, calendars, transcoders, and so forth. Applications 930 can comprise, for example, file system application 934, and sync applications 932 according to implementations of this disclosure. For example, an application to sync a source cluster and a target cluster can be used by a user or administrator to establish a new access zone sync, associate the access zone with a network interface, associate a snapshot set or subset for syncing, managing sync policies, etc. It can be appreciated that a UI for such application can exists, such as within a web UI for the distributed file system as a whole.

Human interface components (not pictured), can be remotely associated with node 900, which can enable remote input to and/or output from node 900. For example, information to a display or from a keyboard can be routed through the input/output interface 940 to appropriate peripheral human interface components that are remotely located. Examples of peripheral human interface components comprise, but are not limited to, an audio interface, a display, keypad, pointing device, touch interface, and the like.

Data storage 920 can reside within memory 910 as well, storing file storage 922 data such as metadata or Local Interconnect Network (LIN) data. It can be appreciated that LIN data and/or metadata can relate to rile storage within processor readable stationary storage device 950 and/or processor readable removable storage device 960. For example, LIN data can be cached in memory 910 for faster or more efficient frequent access versus being stored within processor readable stationary storage 950.

The illustrated aspects of the disclosure can be practiced in distributed computing environments where certain tasks are performed by remote processing devices that are linked through a communications network. In a distributed computing environment, program modules can be located in both local and remote memory storage devices.

Figure 10:
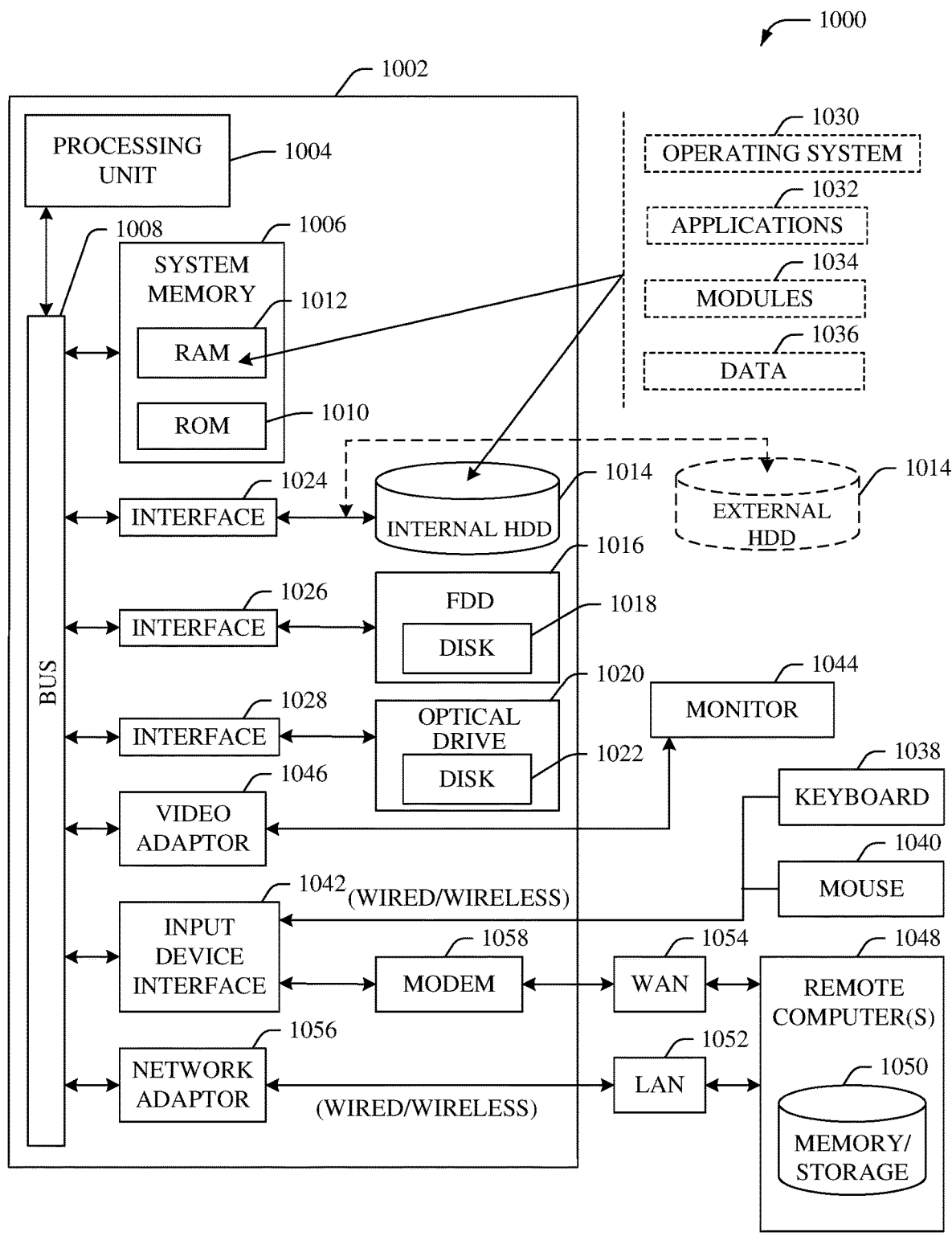
FIG. 10 illustrates a block diagram of an example computer operable to execute the disclosed storage system architecture.

Referring now to FIG. 10, there is illustrated a block diagram of a computer 1002 operable to execute the disclosed file system architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 10, the example environment 1000 for implementing various aspects of the specification comprises a computer 1002, the computer 1002 comprising a processing unit 1004, a system memory 1006 and a system bus 1008. As an example, the component(s), server(s), node(s), cluster(s), system(s), driver(s), module(s), agent(s), and/or device(s) (e.g., IP management components $102_1$-$102_N$, IP management component 102, NAS nodes $104_1$-$104_N$, NAS node 104, clustered system 106, primary network 108, IP network 202, backend network 204, clustered configuration data store 110, distributed resource coordination component 206, ownership request component 302, IP resource object creation component 304, monitoring component 402, kernel IP management interface 504, cluster of nodes 800, nodes 810, 812, 814, and 816, node 900, etc.) disclosed herein with respect to systems 100-500 and 800-900 can each comprise at least a portion of the computer 1002. The system bus 1008 couples system components comprising, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also comprise a wireless access point disposed thereon for communicating with the wireless adapter 1056.

When used in a WAN networking environment, the computer 1002 can comprise a modem 1058, or is connected to a communications server on the WAN 1054 or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It is noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This comprises at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) comprising a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units. One or more processors can be utilized in supporting a virtualized computing environment. The virtualized computing environment can support one or more virtual machines representing computers, servers, or other computing devices. In such virtualized virtual machines, components such as processors and storage devices can be virtualized or logically represented. In an aspect, when a processor executes instructions to perform "operations", this could comprise the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components can reside within a process and/or thread of execution and a component can be localized on one computer and/or distributed between two or more computers. As another example, an interface can comprise input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A node device of a clustered system, comprising:
a processor; and
a memory that stores executable instructions that, when executed by the processor, facilitate performance of operations, comprising:
requesting a distributed resource coordinator component of the clustered system, to grant an exclusive lock on a file of the distributed resource coordinator component, acquiring the exclusive lock on the file being mapped to a specified Internet Protocol (IP) address, wherein the requesting comprises requesting via a communication channel that is independent of an IP network being requested for;
in response to receiving a notification from the distributed resource coordinator component that indicates that the exclusive lock has been granted, acquiring ownership of the specified IP address, instantiating an IP resource object associated with the specified IP address, wherein data from the IP resource object is applied to an interface connected to the node device to facilitate communication via the IP network under request; and
periodically checking the ownership of the IP resource object.

2. The node device of claim 1, wherein the operations further comprise:
receiving, via the communication channel, cluster data associated with the clustered system, wherein the specified IP address is determined based on the cluster data.

3. The node device of claim 2, wherein the cluster data is indicative of a configuration of nodes of the clustered system.

4. The node device of claim 2, wherein the cluster data is indicative of a state of the clustered system.

5. The node device of claim 2, wherein the cluster data is indicative of an IP address pool assigned to the clustered system.

6. The node device of claim 1, wherein the communication channel comprises a backend network link.

7. The node device of claim 6, wherein the backend network link comprises at least one of an InfiniBand link or an Ethernet link.

8. The node device of claim 1, wherein the operations further comprise:
performing a network health check to verify network connectivity associated with the node device; and
in response to determining that the health check satisfies a defined failure criterion, revoking ownership of the specified IP address.

9. The node device of claim 8, wherein the revoking the ownership comprises destroying the IP resource object and releasing the exclusive lock on the file to the distributed resource coordinator component to facilitate a reallocation of the specified IP address to a disparate node device.

10. A method, comprising:
directing, by a node device of a clustered system that comprises a processor, request data to a distributed resource coordinator component of the clustered system via a primary communication network, wherein the request data is indicative of a request for an exclusive lock on a file, wherein acquiring the exclusive lock on the file results in acquiring a first Internet Protocol (IP) address associated with a secondary communication network, wherein the secondary communication network is an IP network;
in response to receiving a notification from the distributed resource coordinator component that indicates that the exclusive lock has been granted, acquiring ownership of the first IP address, initiating, by the node device, an IP resource object associated with the first IP address, wherein data associated with the IP resource object is applied to an interface of the node device associated with the secondary communication network to facilitate communication via the secondary communication network; and periodically checking the ownership of the IP resource object.

11. The method of claim 10, wherein the directing comprises directing the request data via a backend network of the clustered system.

12. The method of claim 10, further comprising:
determining, by the node device, the first IP address based on configuration data associated with the clustered system.

13. The method of claim 12, further comprising:
accessing, by the node device, the configuration data from a configuration data store of the clustered system via the primary communication network.

14. The method of claim 10, wherein the initiating comprises initiating the IP resource object subsequent to claiming ownership of the first IP address based on transmitting an address resolution protocol packet to a switch of the secondary communication network.

15. The method of claim 10, further comprising:
monitoring, by the node device, status data associated with the IP resource object; and
in response to determining, based on the monitoring, that the status data satisfies a defined failure criterion, revoking ownership of the first IP address.

16. The method of claim 15, wherein the revoking the ownership comprises un-assigning the first IP address from the node device, destroying the IP resource object and releasing the exclusive lock on the file to the distributed resource coordinator component to facilitate a reallocation of the first IP address to a disparate node device.

17. A non-transitory computer-readable storage medium comprising instructions that, in response to execution, cause a node device of a clustered system that comprises a processor to perform operations, comprising:

directing, to a distributed resource coordinator of the clustered system via a first communication network, request data indicative of a request for an exclusive lock on a file that is associated with a particular Internet protocol (IP) address associated with a second communication network, wherein the second communication network is an IP network; and in response to determining that the exclusive lock has been granted, acquiring the particular IP address, determining an IP resource object associated with the particular IP address, wherein the IP resource object is applied to a local interface associated with the second communication network to facilitate communication via the second communication network; and periodically checking the ownership of the IP resource object.

18. The non-transitory computer-readable storage medium of claim 17, wherein the particular IP address is determined based on cluster configuration data received via the first communication network.

19. The non-transitory computer-readable storage medium of claim 17, wherein the operations further comprise:
monitoring status data associated with the IP resource object; and
in response to determining, based on the monitoring, that the status data satisfies a defined failure criterion, revoking ownership of the particular IP address.

20. The non-transitory computer-readable storage medium of claim 19, wherein the revoking the ownership comprises destroying the IP resource object and notifying the distributed resource coordinator to facilitate a reallocation of the particular IP address to a disparate node device.

\* \* \* \* \*